United States Patent
Strumpell et al.

(10) Patent No.: US 6,908,778 B2
(45) Date of Patent: Jun. 21, 2005

(54) SURFACE MICRO-PLANARIZATION FOR ENHANCED OPTICAL EFFICIENCY AND PIXEL PERFORMANCE IN SLM DEVICES

(75) Inventors: Mark H. Strumpell, Plano, TX (US); James C. Baker, Coppell, TX (US); David L. Gillespie, Flower Mound, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/653,549

(22) Filed: Sep. 2, 2003

(65) Prior Publication Data

US 2004/0043552 A1 Mar. 4, 2004

Related U.S. Application Data

(62) Division of application No. 10/022,884, filed on Dec. 17, 2001, now Pat. No. 6,614,576.
(60) Provisional application No. 60/255,857, filed on Dec. 15, 2000.

(51) Int. Cl.$^7$ .............................................. H01L 21/00
(52) U.S. Cl. .......................................... 438/22; 438/48
(58) Field of Search ............................. 438/22–29, 48, 438/53–54; 257/710, 738, 680; 359/248, 290

(56) References Cited

U.S. PATENT DOCUMENTS

| | | | |
|---|---|---|---|
| 5,504,614 A | | 4/1996 | Webb et al. |
| 5,535,047 A | * | 7/1996 | Hornbeck .................. 359/295 |
| 5,617,242 A | | 4/1997 | Weaver |
| 6,038,056 A | | 3/2000 | Florence et al. |
| 6,375,790 B1 | * | 4/2002 | Fenner .................. 156/345.28 |
| 6,614,576 B2 | * | 9/2003 | Strumpell et al. .......... 359/248 |

* cited by examiner

*Primary Examiner*—Dung A. Le
(74) *Attorney, Agent, or Firm*—Charles A. Brill; Wade James Brady, III; Frederick J. Telecky, Jr.

(57) ABSTRACT

A method for enhancing the optical performance of a reflective spatial light modulator by micro-planarizing surfaces within the SLM, such as the reflective surface of each pixel, by gas-cluster-ion-beam bombardment.

6 Claims, 6 Drawing Sheets

SURFACE MICRO-PLANARIZATION FOR ENHANCED OPTICAL EFFICIENCY AND PIXEL PERFORMANCE IN SLM DEVICES

This application is a divisional application of application Ser. No. 10/022,884 filed 17 Dec. 2001, now U.S. Pat. No. 6,614,576 which claims priority under 35 U.S.C. §119(e)(1) of provisional application No. 60/255,857 filed 15 Dec. 2000.

FIELD OF THE INVENTION

The present invention relates to spatial light modulators and particularly to reflective spatial light modulators used in projection display systems.

BACKGROUND OF THE INVENTION

Reflective spatial light modulators (SLMs) are small structures typically fabricated on a semiconductor wafer using techniques such as optical lithography, doping, metal sputtering, oxide deposition, and plasma etching, which have been developed for the fabrication of integrated circuits.

Two types of reflective SLMs include micromirror devices and reflective liquid crystal on silicon (LCD) devices. These devices use digital image data to modulate a beam of light by selectively reflecting portions of the beam of light on to a display screen.

In these devices the precision of the reflection angle is critical for good optical efficiency. It is also critical that unwanted light not be reflected to the image where it would raise the black level and lower the image contrast. Thereby, a critical aspect in fabricating these devices is the smoothness of the reflective surface. For example, any stray light coming from the black areas of the image that gets into the projected image degrades the system contrast ratio. As a result, it is desirable to have extremely smooth reflective surfaces.

What is needed is a method to improve the reflectivity of a reflective spatial light modulator.

SUMMARY OF THE INVENTION

The present invention discloses a method for enhancing the optical performance of a reflective spatial light modulator by micro-planarizing surfaces within the SLM, including the reflective surface of each pixel and, in the case of micromirrors, any landing surfaces that have an effect on the tilt angle of the micromirror.

The present invention inserts a gas-cluster-ion-beam bombardment at one or more steps in the process. This process improvement has shown to improve the surface smoothness from $\mu=10$, $\sigma=8$ to $\mu<3$, $\sigma=2$.

By improving the smoothness of the reflective surfaces in these reflective SLMs, which are primarily used in projection displays, the brightness and constant ratio of the projectors can be significantly enhanced.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Micromirror devices have small mirrors that tilt either ON or OFF (typically +10° or −10°), so that light reflected from the ON mirrors is projected on to a viewing screen and light reflected from OFF mirrors is not. These mirrors are attached to a yoke, which is extended above the substrate level of the device by torsion hinges connected to support posts. The mirrors rotate in either the positive or negative direction until landing points on the yoke contact landing pads at a lower level of the device, leaving the mirrors in either a binary ON or OFF state. It is important that both the mirrors and landing pad areas have very smooth surfaces. Rough surfaces on the mirror will scatter incident light, lowering the image contrast. Rough landing surfaces can alter the landing angle of the mirror and change the amount of light reflected by the mirror to the image plane. Typical roughness of these micromirror surfaces is measured to be on the order of $\mu=10$ nm (mean) and $\sigma=8$ nm (standard deviation).

The disclosed invention modifies the reflective spatial light modulator fabrication process flow by adding a gas-cluster-ion-bombardment (GCIB) micro-planarization step at one or more steps in the process flow.

Figure 1:
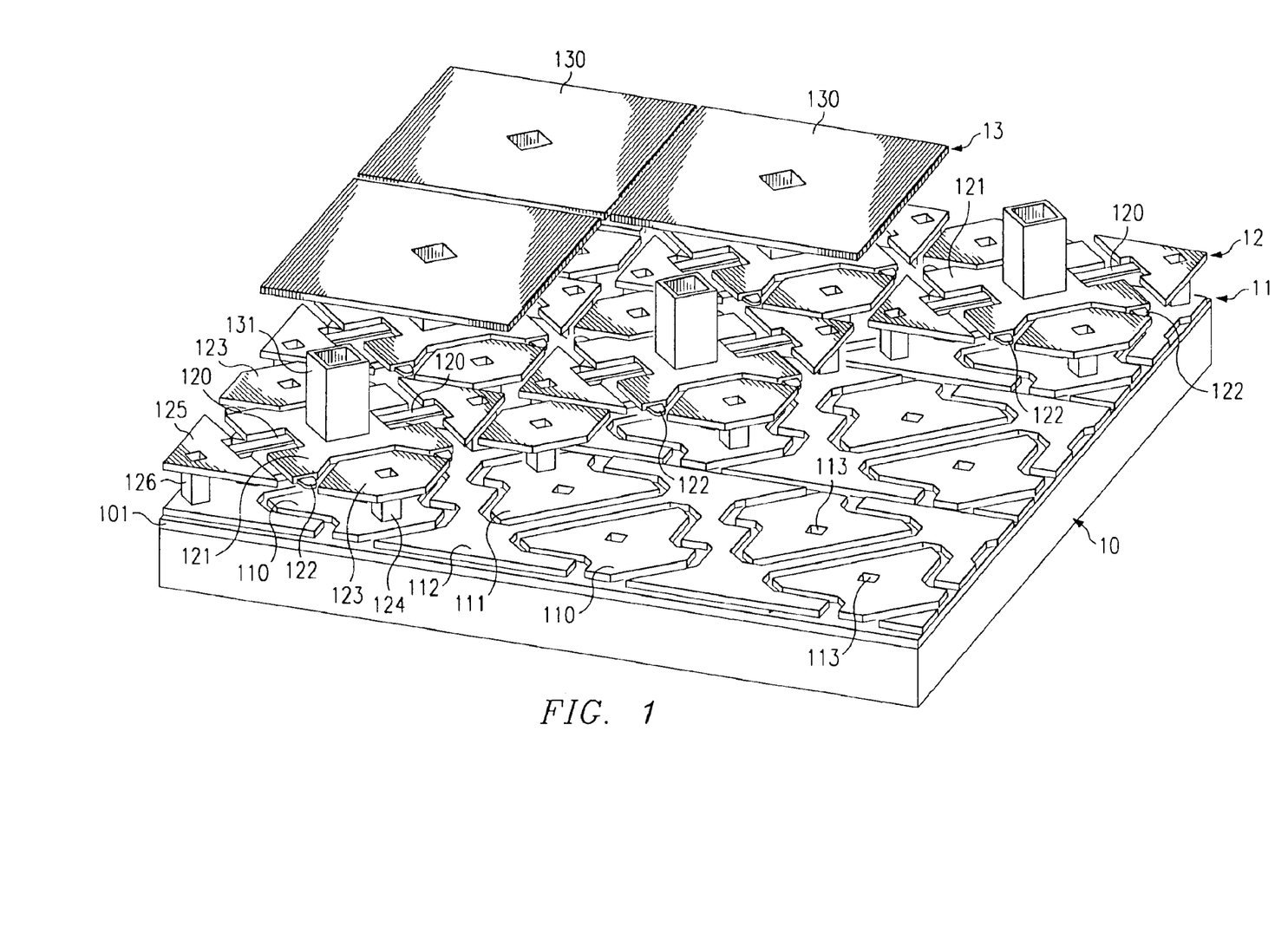
FIG. 1 is a perspective view of a small portion of a digital micromirror device with mirrors removed to show the underlying yoke/hinge and address/landing pad levels of the device.
Figure 2:
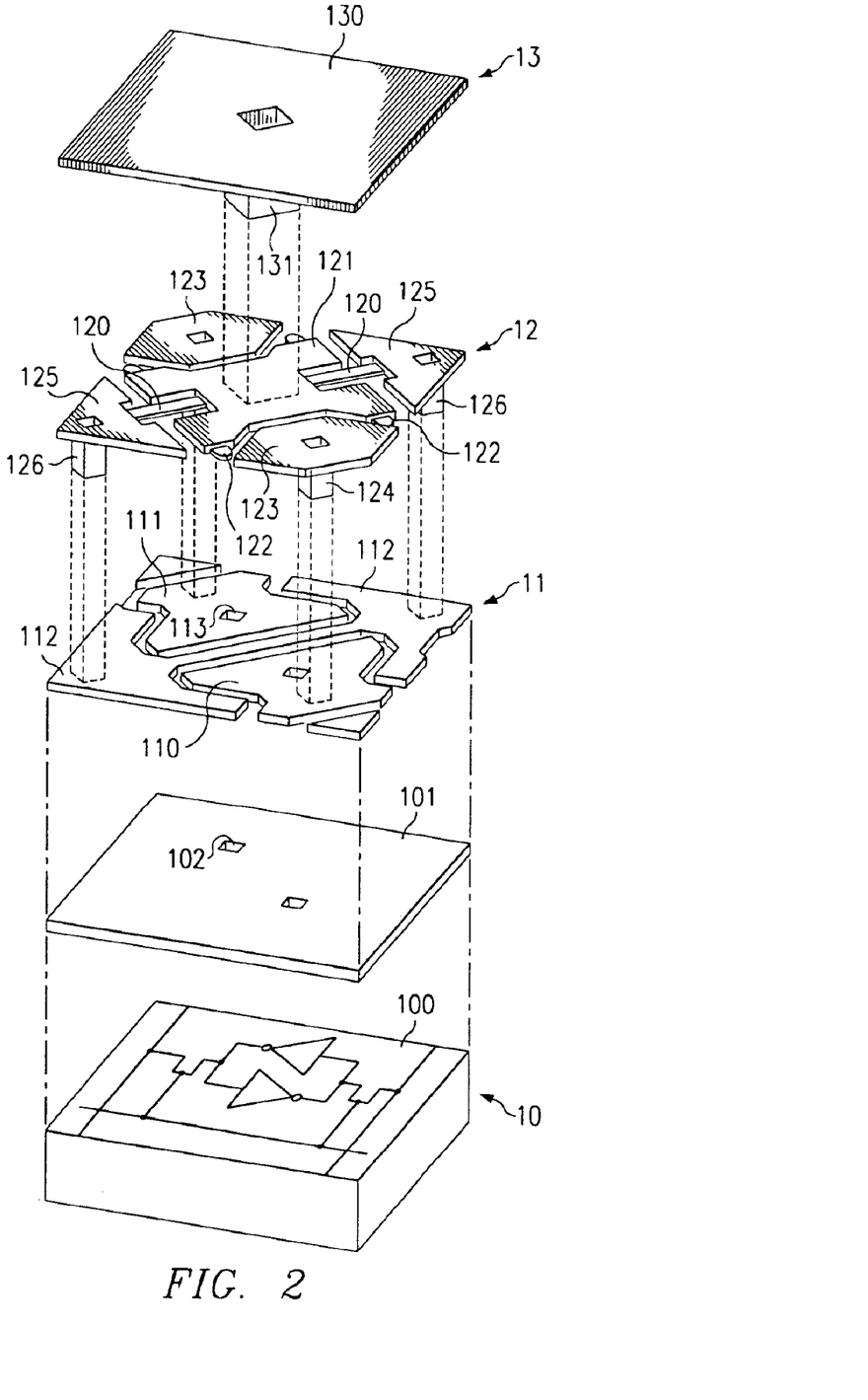
FIG. 2 is an exploded perspective view of a single digital micromirror device pixel showing the substrate memory cell, address electrodes and mirror landing pad level, yoke/torsion hinge level, and reflective mirror level.

FIG. 1 shows a small portion of a micromirror, which is a digital spatial light modulator (SLM) that often includes more than a thousand rows and columns of individual cells or pixels. The micromirror is one device in a family of devices known as micro-electro-mechanical systems (MEMS). FIG. 2 shows the build-up of a single micromirror cell. The device is built-up in four levels, these being a memory substrate level 10, an address electrode/landing pad level 11, a yoke/hinge level 12, and a mirror level 13, as indicated. The substrate 10 contains an orthogonal array of CMOS SRAM address circuits 100 over which the reflective micro-mirror superstructure is fabricated. A thick oxide 101 isolation layer, which has vias 102 for connecting to the CMOS address circuits, is then placed on top of the CMOS array 100. This thick oxide 101 surface is typically planarized using a chemical mechanical polishing (CMP) technique to provide a flat platform on which to fabricate the micromirror superstructure.

The mirror superstructure is then fabricated on top of this isolation layer 101, beginning with an aluminum metal-3 layer 11, which includes yoke address electrodes 110,111 and landing pads 112. The address electrodes 110,111 connect to the respective binary outputs of the CMOS address circuits 100 through the vias 113 and vias 102 in the thick oxide layer. A voltage potential is applied between these address pads 110/111 and the yoke 121 above the address electrode at level 12, which sets up an electrostatic force that causes the yoke/mirror structure to rotate on its torsion hinges 120.

The next layer 12 consists of the yoke 121 and torsion hinge 120 structure, mirror address electrodes 123, and hinge posts 126 and post caps 125. The yoke 121, which supports the mirror assembly 130 on the top level 13, is suspended in air above the metal-3 layer 11 and rotates about a diagonal axis, on the torsion hinges 120, until the yoke landing tips 122 contact the landing pads 112 below. It is seen that the geometry of the yoke 121 and the spacing between the metal-3 level 11 and the yoke/hinge level 12 determines the tilt angle of the yoke/mirror structure. The hinge posts 126 sit on top of and in contact with the metal landing pads 112 at the metal-3 level 11, so that the yoke and landing pads are at the same electrical potential. The mirror address pads 123 are attached to the yoke addressing pads 110 by additional posts 124. In this case, a voltage potential difference is applied between the mirror address electrodes 123 and the mirror 130 above the pad at level 13, which sets up an electrostatic force that assists in causing the yoke/mirror structure to rotate on the torsion hinges 120.

The top level 13 consists of the reflective mirror 130 and mirror post 131, which ride on top of the yoke 121. In operation, electrostatic forces cause the mirror/yoke structure to rotate on its torsion axis, defined along the torsion hinges. These electrostatic forces are established by the voltage potential difference between the yoke address electrode 110/111 and the yoke 121 and between the mirror address electrode 123 and the mirror 130, respectively. In each case, these forces are a function of the reciprocal of the distance between the two plates; e.g., 110/121 and 123/130. As the rigid yoke/mirror structure rotates on its axis, the torsion hinges 120 resist deformation with a restoring torque that is an approximately linear function of the angular deflection of the structure. The structure rotates until either this restoring torsion beam torque equals the established electrostatic torque or until the yoke/mirror structure is mechanically limited in its rotation, e.g., the yoke tips 122 lands on the landing pads 112. For digital display applications, the structure is such that it is mechanically limited in its rotation (lands), so as to provide stable states at approximately +/−10°.

In any reflective SLM, the planarization, or smoothness of the reflective elements within the device, such as the reflective electrodes in a liquid crystal device and the mirror of a micromirror device, is critical. This is both to assure that desired light gets into the focal plane and to prevent stray (unwanted) light from getting into the focal plane and degrading the brightness and contrast ratio of a projection system.

The reflective quality of liquid crystal device address electrodes, whether formed on silicon, glass, or other substrate, is critical to the optical efficiency of a display system. In a micromirror, the smoothness of the yoke landing pads 112 is critical since it affects the precision of the tilt angle which has a direct effect on the optical performance of the device. Although the CMP step in the process flow, as discussed above, provides a somewhat smooth isolated platform on which to build the micro-mirror superstructure, its smoothness is at least two orders of magnitude too rough to avoid degradation of the system optical efficiency.

Figure 3:
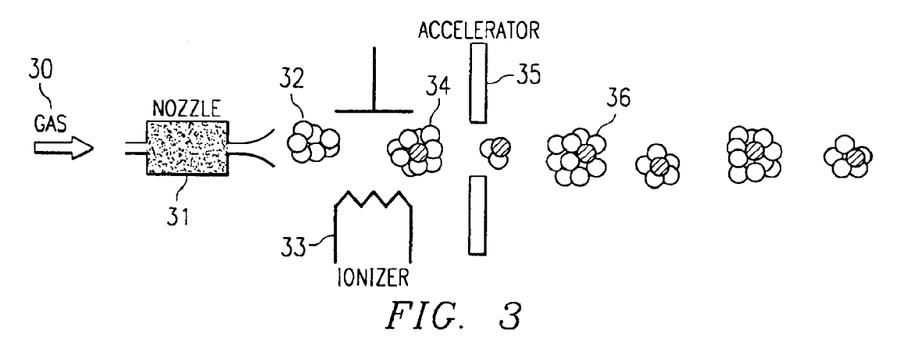
FIG. 3 is a diagram illustrating the gas-cluster-ion-beam bombardment technique, which is added at one or more steps in the improved SLM manufacturing process flow of the present invention to micro-planarize all reflective dependent surfaces within a SLM.

One embodiment of the present invention involves microplanarization of surfaces in the spatial light modulator using a gas-cluster-ion-beam-bombardment planarization technique, as shown in FIG. 3. In a liquid crystal device, the address electrodes, whether formed on silicon, glass, or other substrate, are smoothed using the disclosed GCIB process. In a micromirror, mirror 130 and yoke landing pads 112 are smoothed.

In this process, a gas 30 is discharged through a nozzle 31 and then loosely bound atoms or molecules 32 are ionized 33 by means of an electrical discharge within the gas, producing gas cluster ions, consisting of many atoms or molecules weakly bound to each other and sharing a common electrical charge. It is well known that clusters of atoms or molecules held together by weak inter-atom forces, know as van der Waals forces, can be formed by condensation occurring within the flow of a pressurized gas expanding from a small nozzle into a vacuum. These cluster ions are then propagated under vacuum and their energies are controlled using acceleration voltage 35. The cluster ions 36 have much larger mass and momentum with lower energy per atom than a typical monomer ion carrying the same total energy and as a result, upon impact with a solid surface produce an effect markedly different from monomer ions.

Figure 4:
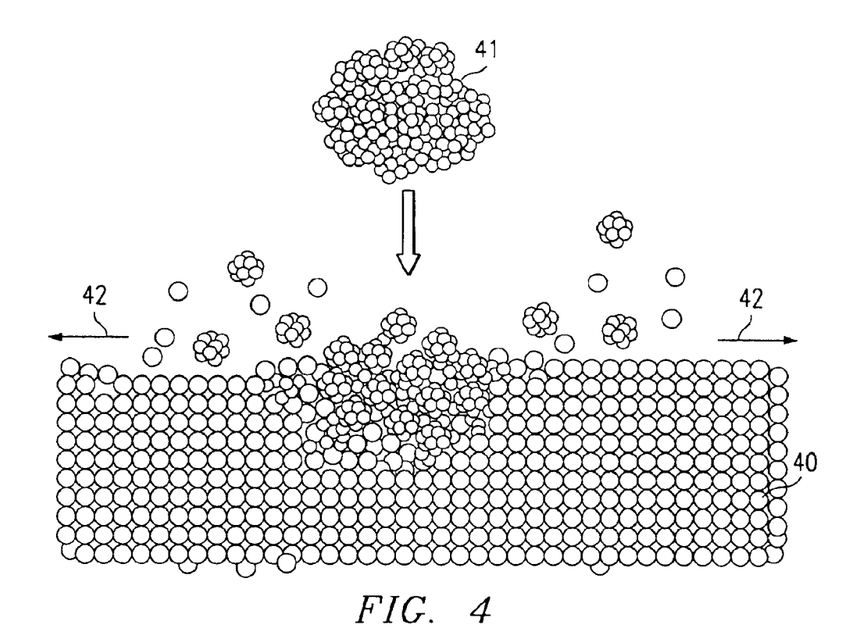
FIG. 4 is a diagram illustrating how a surface is smoothed using the gas-cluster-ion-beam bombardment micro-planarization technique.

FIG. 4 is a sketch illustrating the effect of microplanarizing (smoothing) a solid surface 40 using the gas-cluster-ion-bombardment process. Here the surface 40 is shown being bombarded with a cluster ion 41, which has a combination of high total energy, mass and momentum but with a correspondingly low energy per atom. This produces a virtual simultaneous penetration of the target surface by a large number of spatially coincident atoms or molecules. Unique to gas cluster ions is the high rate of lateral sputtering 42 that occurs at the target surface, which smoothes solid surfaces. It is this effect that significantly improves the smoothness of all reflective critical surfaces within the SLM.

Figure 5:
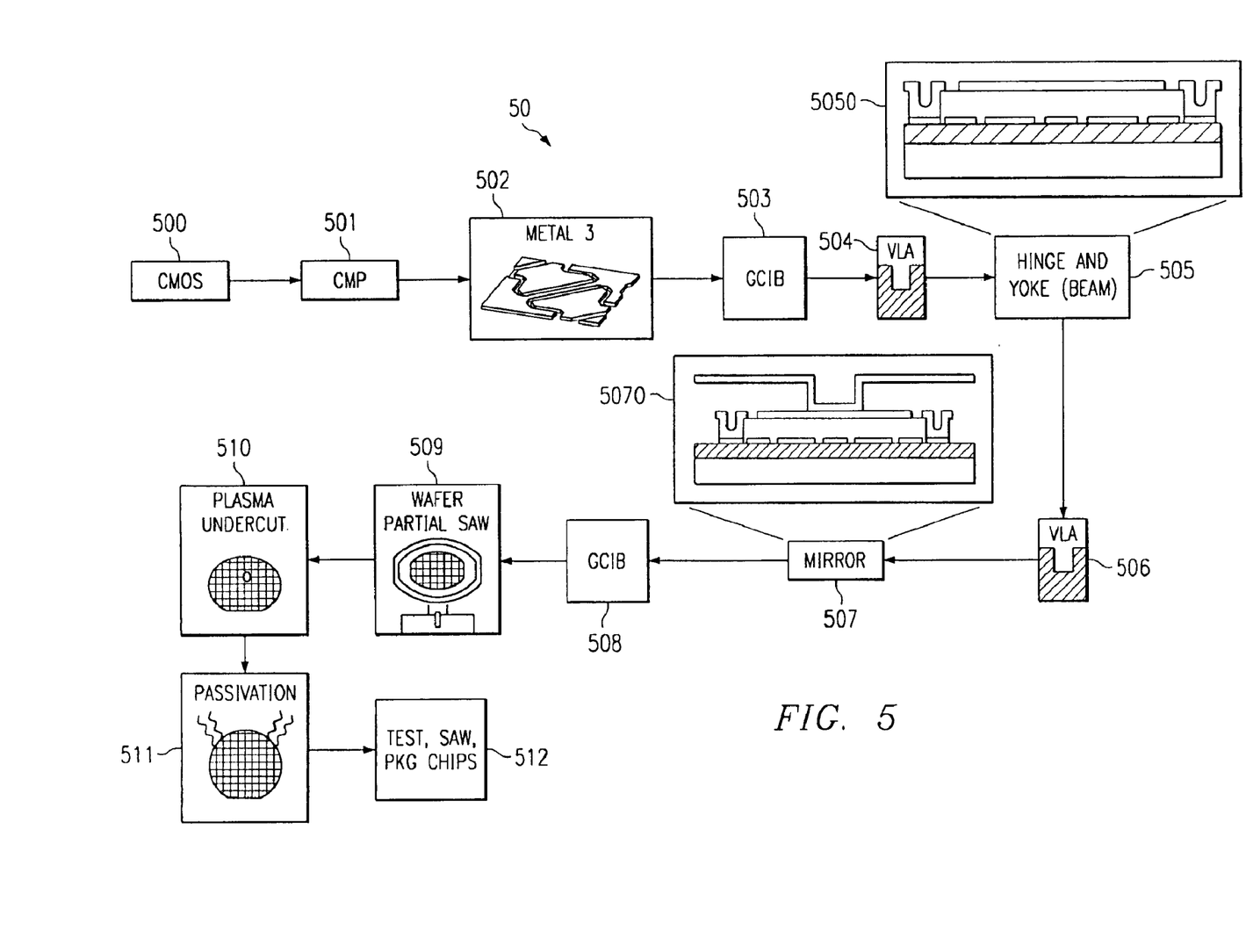
FIG. 5 is a block diagram of the process flow, including the gas-cluster-ion-beam bombardment technique, for fabricating a digital micromirror device spatial light modulator using the improved process of the present invention.

FIG. 5 is a diagram of the improved process flow for the one embodiment of the present invention. In this embodiment, a micromirror superstructure is monolithically fabricated over a CMOS 500 SRAM address circuit. Although this SRAM address circuit uses conventional semiconductor processing techniques, there are significant differences due to the mechanical nature of the superstructure to be built on top of the SRAM. The CMOS 500 circuit is basically an array of SRAM memory cells, which stores the binary state that causes each mirror to tilt either +10° or −10°.

The next step is to deposit a layer of thick oxide over the metal-2 of the CMOS array and then planarize this isolation layer using chemical mechanical polishing (CMP) 501 techniques. Although this polishing or smoothing process provides a flat substrate on which to build the mechanical superstructure, its planarity is at least 2 orders of magnitude worse than what is needed at the critical reflective surfaces of the device.

The superstructure process begins by depositing a metal-3 layer 502 of Aluminum on top of the thick oxide substrate layer and then patterning and etching this Aluminum to form yoke address electrodes 110/111 and yoke landing pads 112, as discussed earlier.

Since the precision of the mirror tilt angle is critical to the optical efficiency of a projection display, the smoothness of the mirror landing pads is important. Therefore, the process is modified at this point to micro-planarize the metal-3 layer using the GCIB 503 technique discussed above. Providing this micro-smooth surface for the tips of the mirrors to land on significantly improves the optical performance of the micromirror by increasing both the brightness and the contrast of the projected image.

An organic sacrificial layer is spun onto the micro-planarized surface of the metal-3 layer and then lithographically patterned and hardened, leaving vias 504 through this layer for metal support posts.

A hinge and yoke 505 (also called a beam) shown in magnified view 5050 are formed. First, a thin metal layer, which is ultimately the hinge material, is sputter-deposited on top of the sacrificial layer. Then a layer of $SiO_2$ is plasma-deposited over this thin metal layer and patterned in the shape of the hinges 120. This pattern serves as an etch mask in the process. Next, a thicker layer of metal is sputter-deposited on top of the thin metal and $SiO_2$, where it is patterned and plasma-etched to form the yoke 121 attached to the hinges 120 and the mirror address electrodes 123. In this structure the thicker metal yoke 121 is attached to metal post 126 by the much thinner metal torsion hinges 120, so that when electrostatic forces are applied, the thinner hinges tend to twist or torque, thereby allowing the thicker metal yoke to tilt.

A second sacrificial layer is then spin-coated onto the exposed yoke and hinge surface of the device and lithographically patterned and hardened, again leaving vias 506 for additional metal support post, this time in the middle of the yoke 121 to support the mirrors 130.

The mirror metal 507 is sputter-coated on top of this second sacrificial layer, also lining the support post via 506 holes. A layer of $SiO_2$ is then plasma-deposited on top of the upper mirror metal surface where it is patterned and plasma-etched to form the individual mirrors 5070 riding on top of the yoke 121, which is attached to the metal posts 126 by thin torsion hinges 120.

A second micro-planarizing step is performed to smooth the exposed metal mirror 130 surfaces, once again using the GCIB 508 micro-planarization technique.

The wafer of micromirror chips is then partially sawed 509 through. Then a plasma undercut 510 technique is used to remove the two sacrificial layers from underneath the mirror 130 and yoke/hinge 121/120 structures, leaving the mirror assembly free to tilt in the positive or negative direction, based on the binary state of the SRAM memory cell over which it is built, when a voltage potential difference is applied.

Finally, the surface of the wafer is passivated 511 and the micromirrors are tested, separated, and packaged 512 into individual spatial light modulators.

Figure 6A:
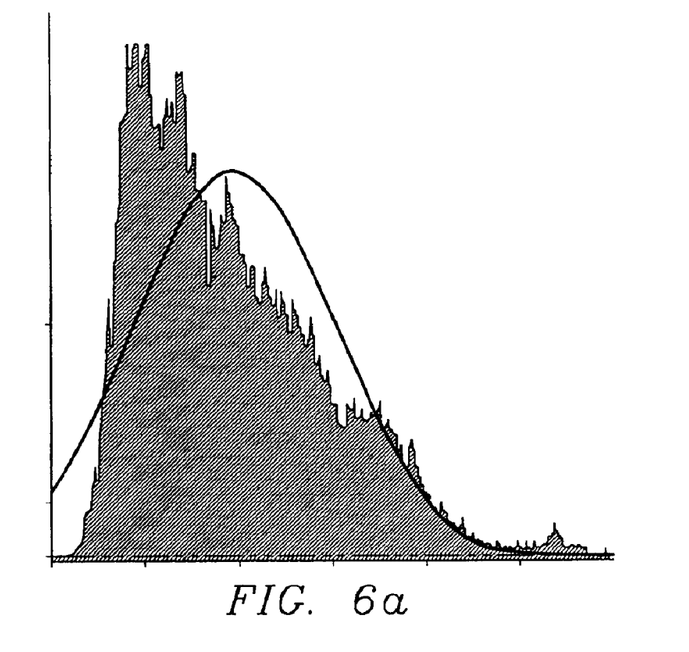
FIGS. 6a and 6b are graphs showing the mean and standard deviation of a surface being micro-planarized before and after the gas-cluster-ion-beam bombardment technique in the improved process flow of the present invention.
Figure 6B:
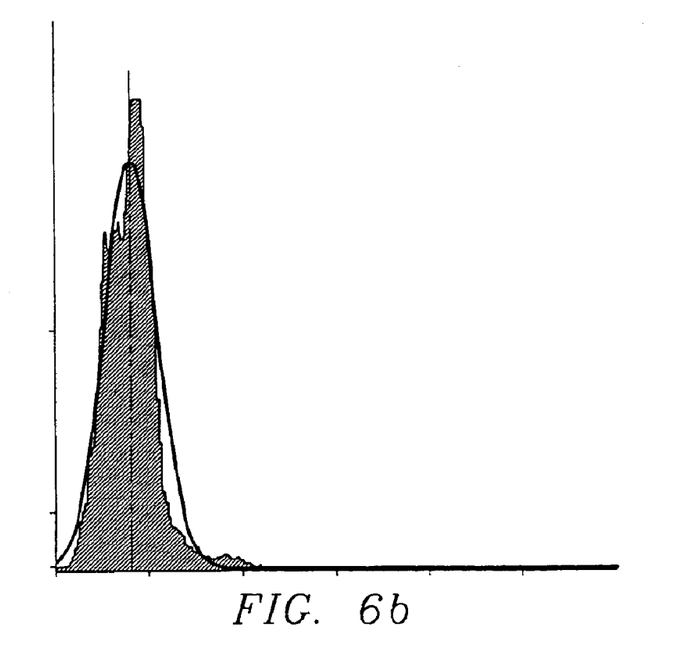

FIGS. 6a and 6b are plots showing the results of smoothing the metal surfaces using the GCIB technique described above. FIG. 6a is a plot of the mirror 130 and/or landing pad 112 metal smoothness before GCIB planarization. A typical value for the mean and standard deviation before planarization (FIG. 6a) is $\mu$=8.4 mm and $\sigma$=10.4 nm, respectively. After micro-planarization using the GCIB technique (FIG. 6b), the measured values are $\mu$=2.1 mm and $\sigma$=2.8 nm, respectively, indicating significant improvement in surface smoothness.

Typically, in order to create an image using the digital micromirror device, the light source is positioned at an angle approximately equal to twice the angle of rotation of the mirrors so that mirrors rotated toward the light source reflect light in a direction normal to the surface of the micro-mirrors and into the aperture of a projection lens, thereby creating bright pixels on an image plane (screen). On the other hand, mirrors rotated away from the light source reflect light away from the projection lens, leaving the corresponding pixels dark. Intermediate brightness levels are created by pulse width modulation techniques where the mirrors are rapidly and repetitively rotated on and off with binary weighted periods. The duty cycle of the mirror determines the quantity of light reaching the screen. The human eye then integrates these light pulses such that the brain perceives a corresponding brightness level.

Full color images are generated by using three micromirror devices to produce three (red, green, blue) color images that are recombined or by sequentially forming three single color images using one digital micromirror device illuminated by a single beam of light passing through a rotating color filter wheel to produce the (red, green, blue) color images.

Figure 7:
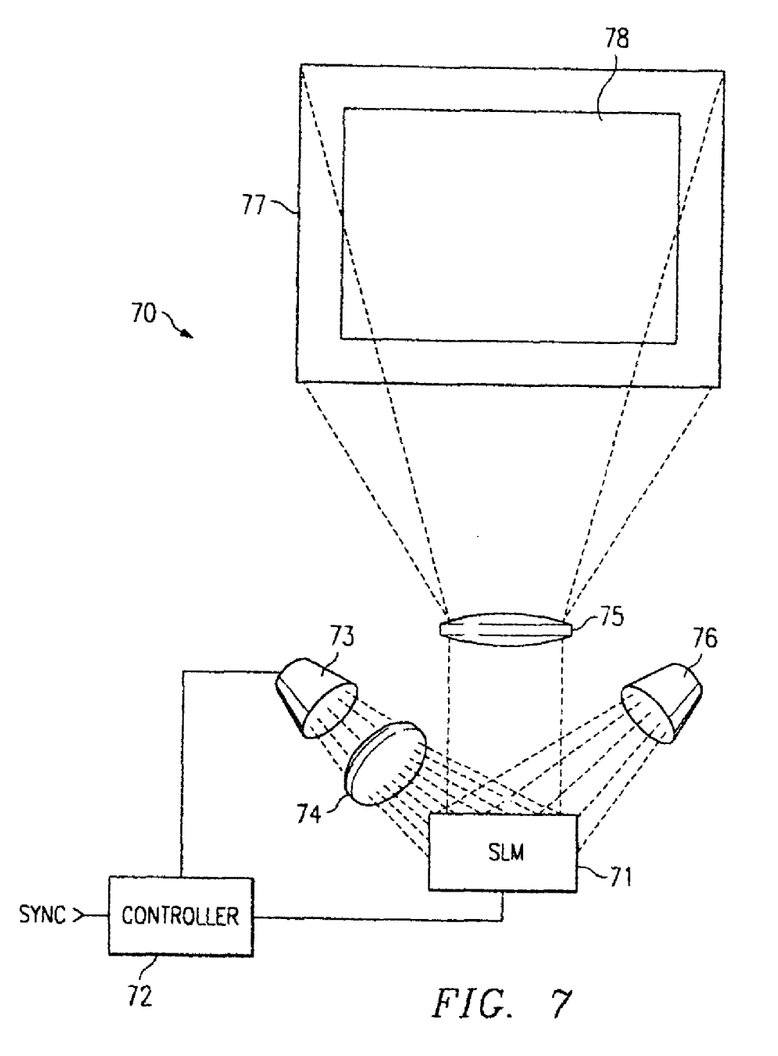
FIG. 7 is a block diagram of a projection display system incorporating a spatial light modulator with enhanced optical efficiency as a result of being micro-planarized using the gas-cluster-ion-beam bombardment technique included in the improved SLM process flow of the present invention.

FIG. 7 is a schematic view of a digital projection system 70 using an improved SLM according to the present invention, to include the micro-planarization of critical surfaces within the device using the GCIB technique. As shown in FIG. 7., light from a light source 73 is focused on to the improved SLM 71 by means of a condenser lens 74, placed in the path of the light. An electronic controller 72, is connected to both the SLM 71 and the light source 73 and used to modulate the SLM 71 and to control the light source 73. For all SLM pixels positioned towards the light source, the incoming light beam is reflected into the focal plane of a projection lens 75, where it resized and projected on to a viewing screen 77 to form an image 78. On the other hand, SLM pixels positioned away from the light source 73, as well as any stray light reflected from various near flat surfaces on and around the SLM, are reflected into a dark trap 76 and discarded.

By modifying the process flow for fabricating SLM devices by including a gas-cluster-ion-bombardment micro-planarizing step for all critical surfaces of the SLM, the optical efficiency (e.g., the system brightness and contrast ratio) is significantly improved.

Thus, although there has been disclosed to this point a particular embodiment and method for surface micro-planarization for enhanced optical efficiency and SLM pixel performance, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of fabricating a reflective spatial light modulator, said method comprising:

providing a semiconductor substrate supporting a metal layer of a spatial light modulator;

smoothing a surface of said metal layer using gas cluster ion beam bombardment; and completing said spatial light modulator.

2. The method of claim 1, said providing step comprising:
  providing a semiconductor substrate supporting a metal layer of a liquid crystal display.

3. The method of claim 1, said providing step comprising:
  providing a semiconductor substrate supporting a metal layer of a micromirror device.

4. The method of claim 1, said providing step comprising:
  providing a semiconductor substrate supporting a metal layer of a micromirror device, the metal layer forming landing pads.

5. The method of claim 1, said providing step comprising providing a semiconductor substrate supporting a metal layer of a micromirror device has been formed, the metal layer forming landing pads, said method comprising:
  providing a semiconductor substrate supporting a metal layer of a micromirror device, the metal layer forming a mirror.

6. The method of claim 1, said providing step comprising:
  providing a semiconductor substrate supporting a metal layer of a micromirror device, the metal layer forming a mirror.

* * * * *